June 17, 1958           A. MEISTER           2,838,799
METHOD FOR TIGHTENING TEXTILE HOSES OR FLEXIBLE TUBES
Filed Sept. 8, 1954
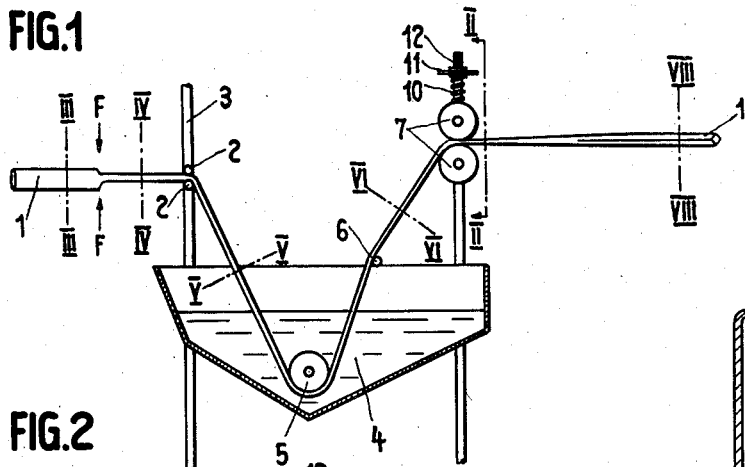
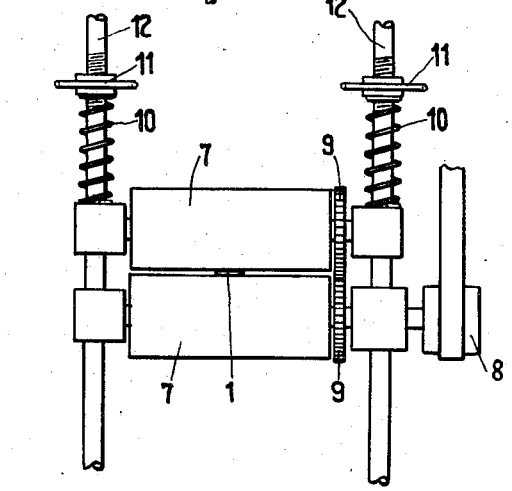
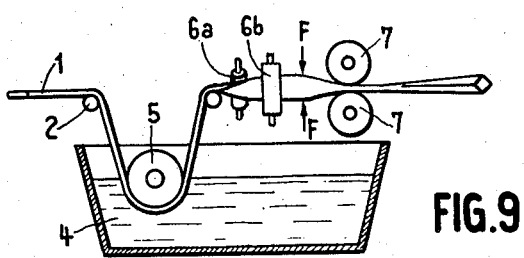
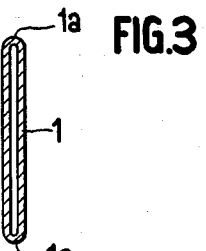
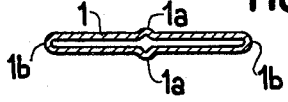
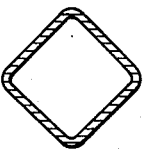
INVENTOR.
Arthur Meister
BY Edward V. Connors
Atty.

United States Patent Office 2,838,799
Patented June 17, 1958

2,838,799
METHOD FOR TIGHTENING TEXTILE HOSES OR FLEXIBLE TUBES

Arthur Meister, Ruegsauschachen i. E., Switzerland, assignor to Meister & Co., Ruegsau, Switzerland Application September 8, 1954, Serial No. 454,735

8 Claims. (Cl. 18—47.5)

This invention relates to a method for tightening textile hoses or flexible tubes, particularly hoses for fire engines.

Methods of this kind are known for textile hoses or tubes (made of woven or plaited fibrous material) for tightening hoses in which the hoses are filled with a liquid containing a tightening material such as rubber, the hoses or tubes being emptied again after a certain filling period, whereafter the tightening material adhering to the inside of the hose is dried.

It is, however, practically impossible, particularly when rubber was used as a tightening material, to obtain a uniform rubber layer having sufficient adherence to the inner hose surface.

According to this invention this drawback of known tightening processes for textile hoses is overcome and a perfect tightening layer may be obtained when the hose is filled with water under pressure before filling the same for the first time with the liquid containing the tightening material.

This preliminary treatment of the hose with water under pressure prior to the treatment with the liquid containing a tightening material has the following beneficial results:

(a) The yarns of the fabric (woven or plaited) will be swelled up by the water whereby the pores and interstices of the fabric are closed so that the liquid containing the tightening or sealing material such as rubber cannot leak through the fabric of the hose when filled into the same.

(b) The wet fibres of the tissue are readily impregnated with the liquid containing the rubber or any other tightening material whereby perfect adherence of the tightening material on the fabric is obtained.

(c) The hoses, generally consisting of a flat and stiff tissue, maintain a round or at least elliptic section after having been filled with water under pressure thereby allowing regular distribution of the liquid containing the tightening material on the whole inner surface of the hose.

When flat hoses are to be treated with the method of this invention they may be subjected to a preliminary external treatment with a liquid containing a tightening or sealing material such as rubber before being filled with the liquid containing the tightening material. In this external treatment the hoses are passed through a suitable bath of the said liquid containing the tightening material and are subsequently subjected to a certain pressure such that the liquid contents of the fabric is brought to a desired value.

This preliminary external treatment is not absolutely required when thick and tight fabrics are to be treated but it cannot be dispensed with when light and loose fabrics are to be treated in order to prevent leakage of the water under pressure and of the liquid containing the tightening liquid when the hoses are filled with it in the subsequent internal treatment.

Flat hoses which have been submitted to the above external preliminary treatment have the tendency to reassume slowly their original flat shape in spite of the treatment with water under pressure when the liquid containing the tightening material is drained from the hoses at the end of the filling period of the internal treatment. Under these circumstances irregularities of the layer and/or untightness in the folds of the hose may occur when the internal layer of tightening material is being dried. Therefore the strength of the internal layer of tightening material may appreciably be reduced particularly in the folds of the hose, which folds are all the same the weakest parts of the hose.

In order to overcome this drawback, flat hoses or tubes, after having been subjected to the above external treatment, are submitted to a compression in the sense of the longer axis of their section before they are filled with water under pressure. Under this pressure in the direction of the longer axis the hose will assume an approximately quadrangular section having rounded corners.

Irrespective of the treatment of the hose the tightening liquid is a solution of rubber, preferably a solution of latex.

Other objects and advantages of the invention will be apparent from the following description and from the accompanying drawings which show, by way of example, a method for tightening flat hoses which are passed, before being filled with water under pressure, through a bath of a rubber solution and which are filled at least once with a rubber solution after the treatment with water under pressure in order to produce an internal tightening layer of rubber.

Fig. 1 is a side view partially in section of an apparatus for external treatment of flat hoses in a rubber containing bath.

Fig. 2 is an enlarged front view of the means for compressing the hoses after treatment in the rubber containing bath, this figure corresponding to a section on the line II—II in Fig. 1.

Figs. 3 to 8 are different sections of the hose shown in Fig. 1 on an enlarged scale taken along the lines III—III, IV—IV, V—V, VI—VI, II—II and VIII—VIII respectively in Fig. 1.

Fig. 9 is a schematic illustration of another embodiment of an apparatus as shown in Fig. 1.

The hose 1 having a flat section as shown in Fig. 3 of the drawing, before entering into the apparatus is subjected to a certain pressure in the direction of the longer axis of its section, in other terms against its folds 1a and vertically to its original flat extension as indicated by the arrows F—F. This compression which may be effected by suitable mechanical means or by hand by a workman standing in front of the apparatus transforms the section of the hose into that shown in Fig. 4. Subsequently the hose 1 is passed between two parallel bars 2 fixed on a suitable support 3. After having passed between the bars 2 the hose having now a section as schematically shown in Fig. 5 which is somewhat flatter than the section shown in Fig. 4 passes through a rubber containing bath 4 where its outer surface is covered with a coating of the liquid. The hose leaves the bath after having passed around the return pulley 5 and passes over a guiding bar 6 and between two pressing cylinders 7.

These cylinders 7 may be mounted as indicated in Fig. 2. The lower cylinder is driven by a pulley 8 and drives the upper cylinder over toothed wheels 9. Pulley 8 is driven by means of a belt from a motor not shown. The pressure of the pressing cylinders may be controlled by means of coil springs 10 of which the tension may be controlled by any conventional means, for instance by means of nuts 11 screwed more or less onto the fixed studs 12 of the frame of the apparatus.

Any other arrangement might, of course, be adopted. The upper cylinder might, instead of being driven over a toothed gear, be driven by the hose 1 advanced between the cylinders by the driven lower cylinder.

Any other pressing means for the hose might be provided instead of the cylinders 7. For instance a pair of pressing rods similar to the rods 2 might be provided between which the hose is passed under pressure after leaving the bath 4 and the spacing of which would preferably be controllable.

Passing of the hose 1 between the pressing cylinders 7 (or between any other suitable pressing means substituted for the said cylinders) will result in a deformation of the hose section (Fig. 7) whereby the original folds 1a are opened and two new folds 1b are formed.

The pressure of the cylinders 7 shall be high enough so that the limit of elasticity of the fabric of the hose is overpassed, in other terms this pressure shall be such that the hose after having passed between the pressure cylinders 7, will not reassume the original flat section but an approximately quadrangular section having rounded angles as shown in Fig. 8. Under the effect of the cylinders 7 the fabric is regularly impregnated with the rubber containing liquid.

This opening of the folds of the hose has the further advantage that uniform impregnation of the hose is obtained in the subsequent filling of the same with a rubber containing liquid for producing a rubber layer on the inner surface of the hose whereby perfect tightness of the hose is obtained without any danger of subsequent putrefaction of the same.

The hose after being externally treated in the apparatus shown in Fig. 1 is air dried. This drying takes about half a day but it may of course be speeded when the hoses are brought into a heated room. During drying the hose conserves substantially the form shown in Fig. 8.

When the above drying is terminated the hose is cut into pieces of for example 20–25 metres long when such cutting has not already been done previously.

In the apparatus shown in Fig. 9 the flat hose 1 is deformed manually by pressure onto the hose just before its entrance between the pressing cylinders 7 (arrows F—F).

Guiding of the hose on its path through the apparatus may be effected in any suitable manner, for instance by means of a horizontal bar 2, a return pulley 5, a turning roller 6a and two vertical parallel bars 6b as shown in Fig. 9.

Whether the above mentioned pieces of flat hose be pretreated externally in accordance with the foregoing description or whether the hoses have not been subjected to such a pretreatment they are subjected, before internal treatment with the rubber-containing liquid to a treatment with water under high pressure in the manner which is described below by way of example.

One end of the hose pieces is connected to a high pressure water tap and the other end of the hose pieces is closed, after the hose pieces have been laid onto a horizontal or preferably slightly inclined support for instance onto a wire trellis. Preferably a number of hose pieces are connected simultaneously to a corresponding number of water taps and are treated simultaneously. The hose pieces are then filled with the water under pressure, the pressure being of for instance 6 atm. (kg./cm.²) and the treating period being of about 15 to 20 minutes. After this treatment the water taps are shut off, the hose pieces are disconnected therefrom and the water flows automatically out of them when the said support is slightly inclined.

After being treated in this way with water under high pressure the hose pieces are suspended in a vertical treating shaft. Filling pipes are connected to the lower ends of the hose pieces whereas the upper ends are closed whereafter a rubber-containing liquid, for instance a solution containing 60% of latex is filled into the hoses. If required any suitable quantities of agents preventing ageing or putrefaction of the fabric of the hoses may be added to the latex solution. Under the effect of the liquid pressure which may be of 3 to 10 atm. (kg./cm.²) at the lower end of the hoses according to the length of the same, the liquid penetrates into the pores of the fabric of the hoses and also into the interstices which might still be present in spite of the preliminary external treatment with a rubber containing liquid. It is desirable to use high treating pressures in order that the relative difference in pressure be rather small throughout the height of the hose piece, whereby irregularities in the development of the tightening layer within the hose may be avoided. At the end of a given treating period of which the length depends on the desired thickness of the tightening layer, the hose is emptied and is left in the same position for a certain time in order that the layer of liquid adhering to the inner surface of the hose may dry, the term "dry" being used to describe the curing or setting process. Due to the preliminary treatment of the hose set out in the foregoing the hose will not move appreciably during drying of the tightening layer so that a layer of perfect regularity will be formed in the hose.

After complete drying of the first layer filling with the rubber containing solution may be repeated if desired. In the same way the hose may be filled a third time, when the second layer of the tightening material which is preferably rubber, has entirely dried, and so on as many layers as may be desired. The filling period and the pressure of the rubber containing liquid may be varied for different fillings. Practically four to six layers of rubber are applied in hoses for fire engines according to the mechanical duties the hoses will be subjected to.

In order to speed up drying of the applied layers of liquid the treating shaft may be heated.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

What I claim is:

1. A method for tightening a textile hose of flat cross sectional shape, particularly a hose for fire engines, comprising passing the said flat hose through a bath of a rubber-containing solution for applying a layer of the rubber-containing solution to the outer surface of the hose, passing the hose leaving the said bath between rotating cylinders compressing the hose in the direction of the longer axis of its section whereby surplus solution is pressed out of the hose and the section of the hose is transformed to be approximately quadrangular with rounded edges, drying the hose in order to dry the rubber adhering to the same, filling the hose with water under a pressure of 6 kg./cm.² during 15 to 20 minutes for thoroughly wetting and stretching the hose, draining the water from the hose, suspending the hose in vertical position, connecting the lower end of the hose to an inlet tube for a rubber-containing solution and filling the hose with such rubber-containing solution, closing the upper end of the hose and applying a pressure of 3 to 10 kg./cm.² to the volume of rubber-containing solution enclosed in the hose, draining the said rubber-containing solution from the hose and leaving the hose in its suspended vertical position until the layer of rubber-containing solution adhering to the inner surface of the hose has dried.

2. A method according to claim 1, in which the said steps of filling the hose with the rubber-containing solution, closing the upper end of the hose, applying the said pressure to the volume of rubber-containing solution, draining the rubber-containing solution from the hose and leaving the hose in its suspended, vertical position until the layer of rubber-containing solution adhering to the inner surface of the hose has dried are repeated at least once.

3. A method according to claim 1, wherein the hose is brought into approximately horizontal position for being filled with water under the said pressure.

4. A method according to claim 2, wherein the hose is brought into approximately horizontal position for being filled with water under the said pressure.

5. A method for tightening a textile hose of flat cross sectional shape particularly a hose for fire engines, comprising compressing the hose in the direction of the longer axis of its section, the section of said tube being thereby transformed to be approximately quadrangular with rounded edges, filling the hose with water under a high pressure at which pressure the hose is thoroughly wetted and stretched, draining the water from the hose, the said high pressure being so adjusted that the hose maintains substantially a round cross section after removal of the pressure, suspending the hose in vertical position, connecting the lower end of the hose to an inlet tube for a rubber-containing solution and filling the hose with such rubber-containing solution, draining the said rubber-containing solution from the hose and leaving the hose in its suspended vertical position until the layer of rubber-containing solution adhering to the inner surface of the hose has dried.

6. A method for tightening a hose made of a close and strong textile braiding adapted for use with high pressures particularly in connection with fire engines, comprising filling the hose for 15 to 20 minutes with water under a pressure at which the hose is thoroughly wetted and is stretched to a degree that the hose is expanded to take a round cross-sectional shape and at least substantially maintains this round cross-sectional shape after removal of the pressure, draining the water from the hose, filling the hose with a rubber containing fluid, draining the said rubber-containing fluid from the hose and drying the layer of rubber-containing fluid adhering to the inner surface of the hose.

7. A method for tightening a textile hose, particularly a hose for fire engines, comprising filling the hose with water at a pressure such that the hose is thoroughly wetted and stretched to such a degree that it is expanded to take a round cross-sectional shape, draining the water from the hose, the said pressure being so adjusted that the hose maintains a substantially round cross-sectional shape after removal of the pressure, filling the hose with a rubber-containing solution, draining the said rubber-containing solution from the hose and drying the layer of rubber-containing solution adhering to the inner surface of the hose.

8. A method according to claim 7, comprising repeating at least once the said steps of filling the hose with a rubber-containing solution, draining the said rubber-containing solution from the hose and drying the layer of rubber-containing solution adhering to the inner surface of the hose.

References Cited in the file of this patent

UNITED STATES PATENTS

| 58,377 | Chaffee | Oct. 2, 1866 |
| 247,833 | Mayall | Oct. 4, 1881 |
| 1,805,245 | Hopkinson et al. | May 12, 1931 |

FOREIGN PATENTS

| 484,567 | Great Britain | May 2, 1938 |